(No Model.)
M. A. DAVIS.
DRESS MAKER'S GUIDE.
No. 365,800. Patented July 5, 1887.
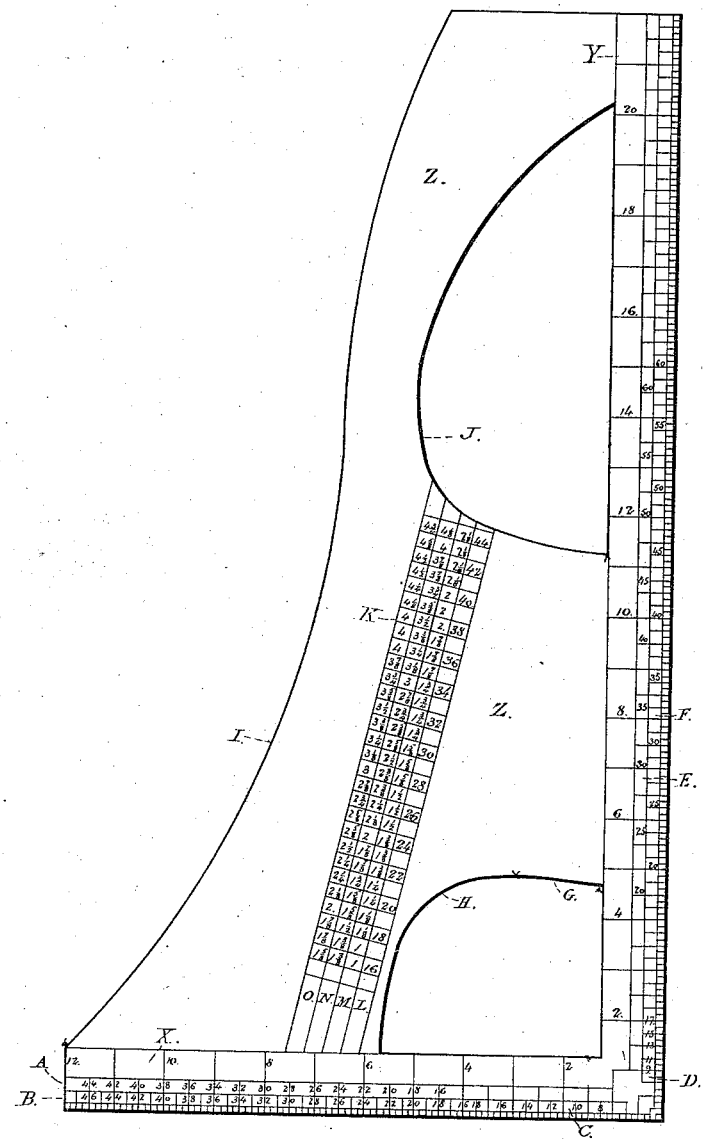
Witnesses:
Burton A. Kinney
T. J. Ilsley
Inventor:
Myra A. Davis
per atty
Elgin C. Verrill

UNITED STATES PATENT OFFICE.

MYRA A. DAVIS, OF PORTLAND, MAINE.

DRESS-MAKER'S GUIDE.

SPECIFICATION forming part of Letters Patent No. 365,800, dated July 5, 1887.

Application filed March 15, 1887. Serial No. 231,058. (No model.)

*To all whom it may concern:*

Be it known that I, MYRA A. DAVIS, of Portland, in the county of Cumberland and State of Maine, have invented certain new and useful Improvements in Dress-Makers' Guides; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The figure is a view of my invention.

The design of my invention is to provide a guide for drafting patterns of dress-waists, by means of which and certain measures on the body a reliable fit can always be secured.

Figure 1 shows the form or model by which the different patterns or parts comprising a waist are marked out, by which the curved lines are governed, and by means of which, from certain measurements upon the body of the person to be fitted, other calculations are ascertained.

The arms X and Y form a common square having a scale of inches and subdivisions thereof marked upon them.

A is a scale for use in measurements on back waist-line, B on front waist-line, C on front neck, D on back neck, E on back bust-line, F on front bust-line, and in all other measurements the common scale is used. The curve G is used in forming the back neck; H, the front neck; I, the curved seams in the back, the shoulder, and biases, and J the front and back arm sizes. All curves begin at the cross $x$ and extend indefinitely.

K is a table of computations for finding the width of the center-back, side-body, and under-arm parts when the waist-measure is known. In this table, L is a column containing the various waist-measures, and M, N, and O are columns containing, respectively, the widths of the center-back, side-body, and under-arm parts, which correspond with the given waist-measures. Thus, if the waist-measure be 36 in L, the widths of the center back, side body, and under arm would be found opposite 36 in M, N, and O, respectively.

Having thus described my invention and the method of using the same, I claim—

An apparatus or guide for marking dress-patterns to be used in connection with certain measurements first to be made on the body of the person to be fitted, consisting of the body part Z, having the back-neck curve G, front-neck curve H, biaser and shoulder curve I, and arm-size curve J, and marked thereon the table of measures K, composed of the parts L M N O, as and for the uses specified, in combination with the common square X Y on two adjacent edges, on which square are marked all the measuring-scales, A B C D E F, used in the system, all substantially as and for the purposes hereinbefore set forth.

In testimony that I claim the foregoing as my own I affix my signature in presence of two witnesses.

MYRA A. DAVIS.

Witnesses:
S. W. BATES,
ROBERT A. DAVIS.